US012084889B2

(12) United States Patent
Stendal et al.

(10) Patent No.: US 12,084,889 B2
(45) Date of Patent: Sep. 10, 2024

(54) MOUNTING ARRANGEMENT FOR FASTENING A SHAFT IN A LOCKING DEVICE, AND LOCKING DEVICE COMPRISING SUCH A MOUNTING ARRANGEMENT

(71) Applicant: STENDALS EL AB, Västerås (SE)

(72) Inventors: Fredrik Stendal, Västerås (SE); Lars Jensen, Surahammar (SE)

(73) Assignee: STENDALS EL AB, Västerås (SE)

( * ) Notice: Subject to any disclaimer, the term of this patent is extended or adjusted under 35 U.S.C. 154(b) by 569 days.

(21) Appl. No.: 17/287,179

(22) PCT Filed: Oct. 22, 2019

(86) PCT No.: PCT/SE2019/051038

§ 371 (c)(1),
(2) Date: Apr. 21, 2021

(87) PCT Pub. No.: WO2020/085982

PCT Pub. Date: Apr. 30, 2020

(65) Prior Publication Data

US 2021/0388635 A1 Dec. 16, 2021

(30) Foreign Application Priority Data

Oct. 23, 2018 (SE) .................................. 1851307-7

(51) Int. Cl.
*E05B 3/08* (2006.01)
*E05B 3/04* (2006.01)

(52) U.S. Cl.
CPC . *E05B 3/08* (2013.01); *E05B 3/04* (2013.01)

(58) Field of Classification Search
CPC .......... E05B 15/0033; E05B 3/04; E05B 3/08; E05B 2015/0437; E05B 2015/0458; Y10T 292/59; Y10T 292/93; Y10T 292/96
See application file for complete search history.

(56) References Cited

U.S. PATENT DOCUMENTS 283,134 A * 8/1883 Mills ......................... E05B 3/04 403/105
516,670 A * 3/1894 Weatherwax ............. E05B 3/04 292/353

(Continued)

FOREIGN PATENT DOCUMENTS

DE 1553444 B1 10/1970
DE 2634771 A1 2/1978

(Continued)

*Primary Examiner* — Carlos Lugo
(74) *Attorney, Agent, or Firm* — Dilworth & Barrese, LLP

(57) ABSTRACT

The present invention relates to a mounting arrangement for fastening a shaft in a locking device, the mounting arrangement (1) comprising—a shaft (2) for insertion into a handle follower of a locking device; —a locking member (33) for fixating the shaft after insertion to prevent undesired removal from the handle follower, and—a release member (32) for releasing the locking member to enable desired removal of the shaft from the handle follower, wherein the locking member (33) is movable between a locking position for fixating the shaft in the handle follower and a release position, and wherein the release member (32) is operatively connected to the locking member for moving the locking member from the locking position to the release position. The invention also relates to a locking device (10) comprising such a mounting arrangement (1).

11 Claims, 6 Drawing Sheets

(56) References Cited

U.S. PATENT DOCUMENTS

Figure 1B:
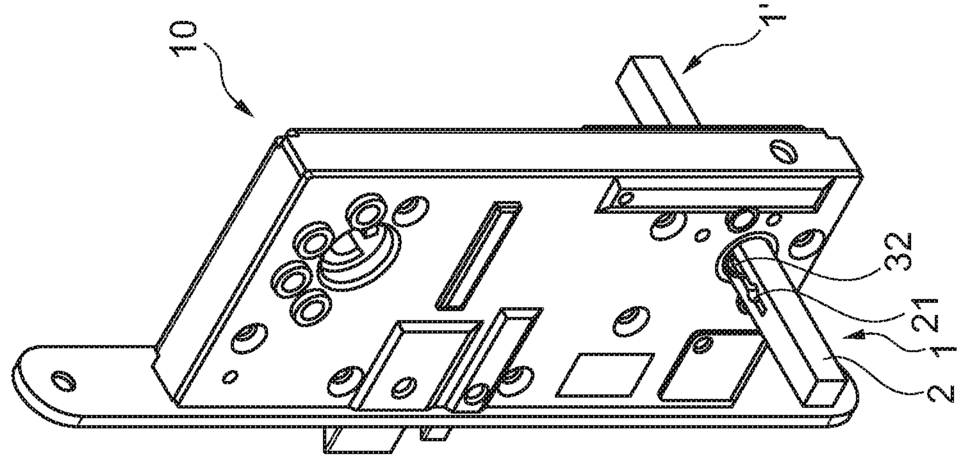

| | | | | | |
|---|---|---|---|---|---|
| 2,501,940 | A * | 3/1950 | Hibbard | A47J 45/071<br>403/329 |
| 3,468,568 | A * | 9/1969 | Ulich | F16D 1/0876<br>403/375 |
| 6,260,733 | B1 * | 7/2001 | Eimerman | A47J 45/071<br>220/759 |
| 7,475,925 | B2 * | 1/2009 | Huang | E05B 15/02<br>292/87 |
| 8,967,686 | B2 * | 3/2015 | Rudhager | E05B 63/006<br>292/357 |
| 2010/0187839 | A1 * | 7/2010 | Barlett | E05B 3/04<br>292/348 |
| 2013/0175811 | A1 | 7/2013 | Hodgin | |

FOREIGN PATENT DOCUMENTS

| | | | |
|---|---|---|---|
| DE | 42 30 476 | A1 | 3/1994 |
| DE | 295 00 354 | U1 | 2/1995 |
| EP | 2050900 | A2 | 4/2009 |
| GB | 165927 | A * | 6/1921 |
| JP | 2002-70369 | A | 3/2002 |
| KR | 200194167 | Y1 * | 9/2000 |
| SE | 1750295 | A1 | 9/2018 |

* cited by examiner

MOUNTING ARRANGEMENT FOR FASTENING A SHAFT IN A LOCKING DEVICE, AND LOCKING DEVICE COMPRISING SUCH A MOUNTING ARRANGEMENT

TECHNICAL FIELD

The present invention relates to a mounting arrangement for fastening a shaft in a locking device, the mounting arrangement comprising

- a shaft for insertion into a handle follower of a locking device;
- a locking member for fixating the shaft after insertion to prevent undesired removal from the handle follower, and
- a release member for releasing the locking member to enable desired removal of the shaft from the handle follower.

BACKGROUND

When mounting a locking device in a door, door handles need to be attached to the locking device in order for the door to be opened and closed. Generally, a shaft is inserted into the locking device and secured so that a door handle mounted on the shaft is able to transfer a rotational motion to the locking device and thereby operate a bolt mechanism as is well known within the art.

For locking devices with a split spindle, a shaft is inserted from each side and are able to rotate independently of each other. In some prior art technologies, the two shafts are rotatably attached to each other so that they are held in place but still able to rotate independently, but such mounting is generally cumbersome and time consuming. In other prior art solutions, shafts are attached to either side of the locking device through a magnetic connection but this is vulnerable to forces applied to the handle that aim to break the magnet and thereby release the shaft.

If a shaft is released from the locking device through outer force or malfunction, the situation might arise where the door can either be forced by a person breaking into the locking device through the hole where the shaft should have been attached, or alternatively the operation of the door handle can be prevented altogether by the shaft no longer being able to transfer a rotation from the handle to the locking bolt mechanism. This is especially serious from a safety perspective, especially during a fire or other emergency, since persons may be trapped inside a room or building, resulting in injury or even death.

An improved mounting arrangement for mounting a door handle in a locking device is therefore needed, where the mounting is significantly facilitated while at the same time providing a secure mounting that is reliable over time and prevents malfunction.

SUMMARY OF THE INVENTION

The object of the present invention is to eliminate or at least to minimize the problems mentioned above. This is achieved through a mounting arrangement and a locking device comprising such a mounting arrangement according to the appended independent claims.

Through the invention, a mounting arrangement is provided that is easy to handle during mounting of the shaft and also during removal of the shaft from the locking device. While in place, the shaft is securely fastened to prevent malfunction or undesired removal, thus providing a significant improvement over the prior art.

Thus, a mounting arrangement according to the present invention comprises a shaft for insertion into a handle follower of a locking device; a locking member for fixating the shaft after insertion to prevent undesired removal from the handle follower, and a release member for releasing the locking member to enable desired removal of the shaft from the handle follower, wherein the locking member is movable between a locking position for fixating the shaft in the handle follower and a release position, and wherein the release member is operatively connected to the locking member for moving the locking member from the locking position to the release position.

When the locking member is in the locking position, the shaft is fixated in the handle follower and cannot be removed until the locking member is moved to the release position. The release member is connected to the locking member, preferably integrated with the locking member but alternatively operatively connected in such a way that the release member can act on the locking member and move it from the locking position to the release position.

According to one aspect of the invention, the locking member is biased away from the shaft towards the locking position and wherein the release member is operatively connected to the locking member for acting against the bias and press the locking member towards the shaft into the release position for releasing the locking member.

The biased locking member gives a secure fastening of the shaft of the mounting arrangement in the handle follower of the locking device, and an improved and reliable removal of the mounting arrangement is achieved through the release member that can be pressed to act against the bias and thereby release the locking member to enable removal of the mounting arrangement.

According to an aspect of the invention, the shaft comprises a groove and at least one of the locking member and the release member are arranged at least partly in said groove. Thereby, adapting a shape of the shaft to accommodate both the shaft and the release member or locking member in the handle follower is avoided to keep the shaft as strong as possible since removal of material can largely be avoided. The groove also serves to hold the release member and locking member in place to avoid misplacement in a sideways direction.

According to another aspect of the invention, the release member is biased away from the shaft and connected to the locking member in such a way that an applied force that acts against the bias of the release member also acts against the bias of the locking member. Thereby, the locking member is released in a stable and reliable manner. Preferably, the release member and locking member both form part of a wire spring or leaf spring that is attached to the shaft and that provides a bias in a direction essentially perpendicular to the shaft so that the locking member is pressed against an inner surface of the handle follower of the locking device. In the mounted state, the locking device extends on a back side of the handle follower or alternatively extends into a notch or groove in the handle follower and thereby provide the secure fastening that is one of the main benefits of the present invention.

According to yet another aspect of the invention, the locking member and the release member form part of a shaft operator, said shaft operator having a first portion that is mounted in a transversal opening in the shaft and a second portion that extends in a longitudinal direction along the shaft towards a shaft end, said first portion being configured to create a bias so that the second portion is biased in a transversal direction away from the shaft, and wherein the release member and locking member are parts of the second portion. Thereby, a compact and convenient mounting arrangement with few separate components can be achieved and the risk of parts coming loose is largely eliminated. The shaft operator is preferably a wire spring or leaf spring that provides a biasing force while at the same time using a very limited amount of space and being easy and convenient to mount and handle. Preferably, the locking member is an end portion of the second portion of the shaft operator, said end portion being configured to extend in an essentially transversal direction from the shaft for cooperating with a handle follower to prevent removal of the shaft from the handle follower.

According to a further aspect of the invention, the locking member and release member or the shaft operator comprising the locking member and release member are/is fixedly attached to the shaft or integrated with the shaft. Thereby, the mounting arrangement is rendered more stable and removal of the locking member and release member is prevented altogether, further facilitating the process of mounting the arrangement in a locking device.

The invention also provides a locking device according to the appended independent claim. Preferably, a handle follower of the locking device is configured to cooperate with the locking member of the mounting arrangement to fixate the shaft of the mounting arrangement in the handle follower. The locking member can extend into a space or play at a back side of the handle follower or can alternatively extend into a cavity in the handle follower, preferably a notch or groove so that the locking member is prevented from escaping from the handle follower unless the release member is activated. It is advantageous to prevent the locking member from contacting a similar handle follower that is arranged in the locking device to receive a mounting arrangement for a handle on an opposite side of the locking device. For this purpose, providing a play or a cavity in the handle follower is advantageous, and it is also beneficial to avoid removing material from the handle follower to maintain the strength of the handle follower as far as possible. For this reason, any cavity can be kept small or alternatively a hardened or otherwise durable material can be selected for the handle follower.

According to one aspect of the invention, the handle follower of the locking device comprises a groove or a plurality of cavities distributed along an inner circumference of the handle follower for receiving the locking member. Thereby, the locking member can be held securely by the handle follower while at the same time keeping the handle follower strong to avoid damages or breakage during use for the entire lifetime of the locking device.

Many additional benefits and advantages of the invention will become readily apparent to the person skilled in the art in view of the detailed description below.

DRAWINGS

Figure 1A:
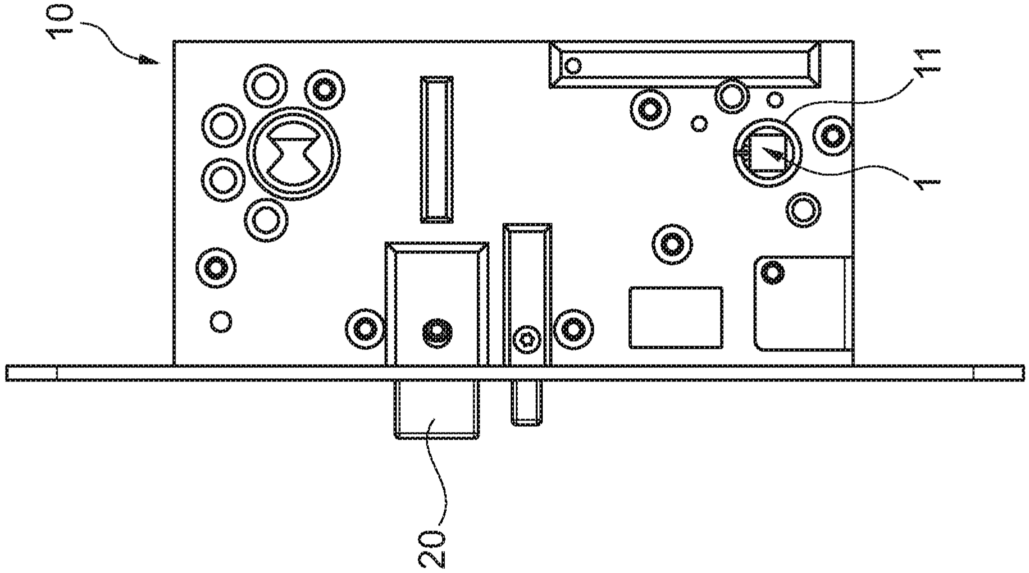

The invention will now be described in more detail with reference to the appended drawings, wherein FIG. 1*a* discloses a planar view of a locking device with a mounting arrangement according to a preferred embodiment of the present invention;

FIG. 1*b* discloses a perspective view of the locking device of FIG. 1*a;*

Figure 2A:
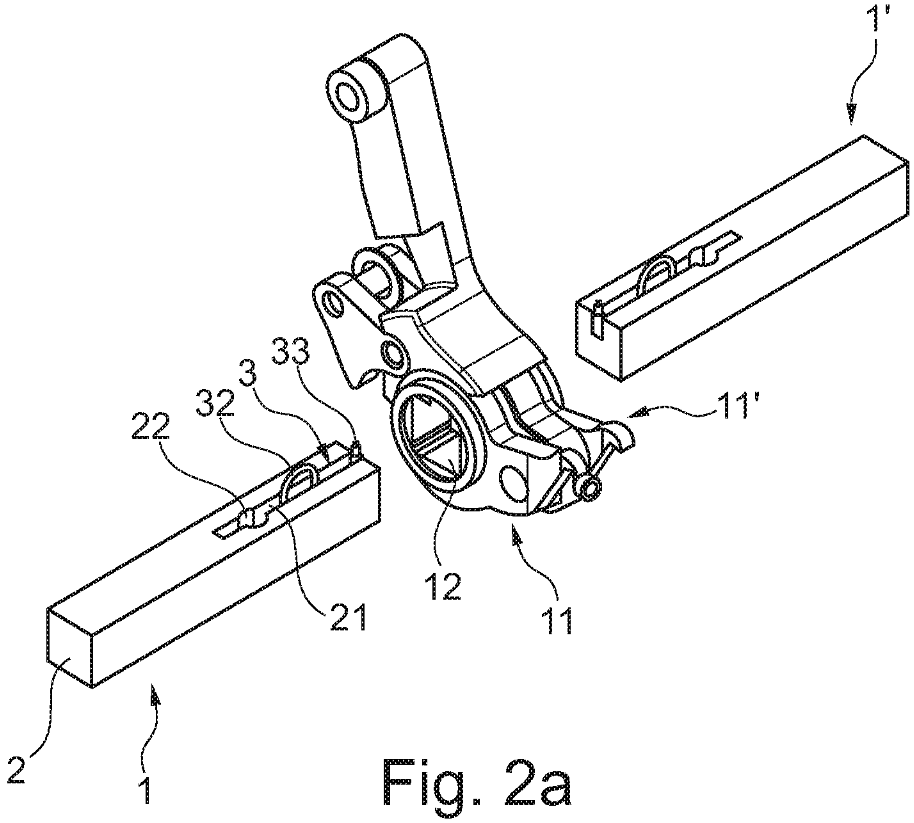
Figure 2B:
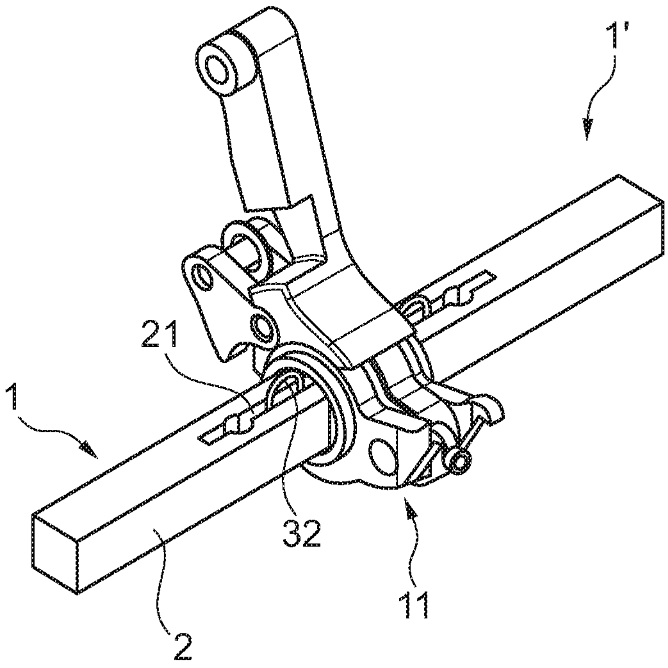
Figure 3A:
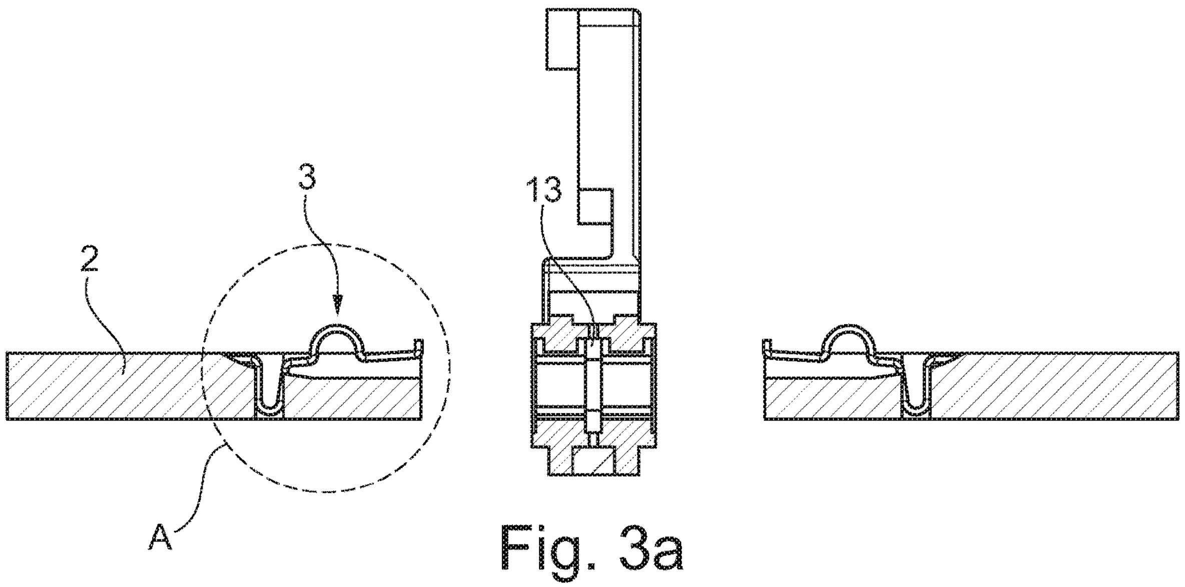
Figure 3B:
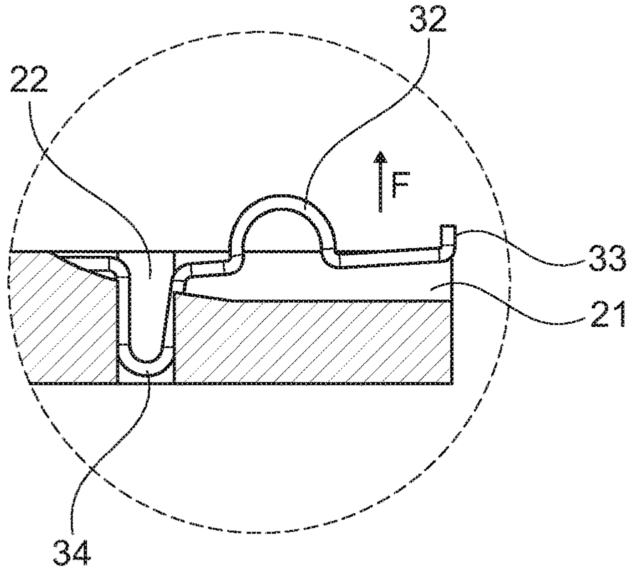
Figure 4A:
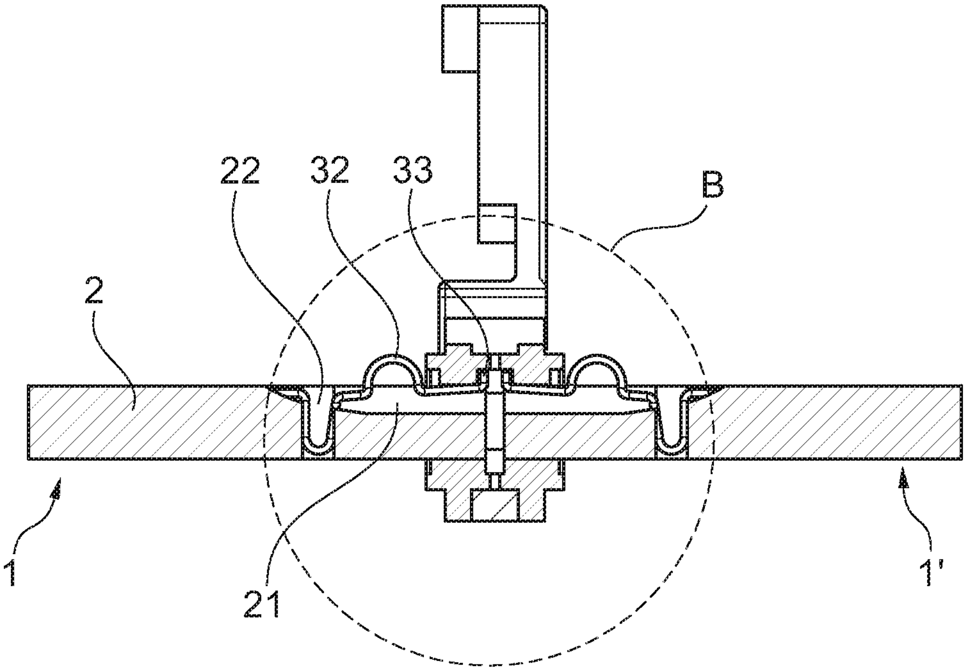
Figure 4B:
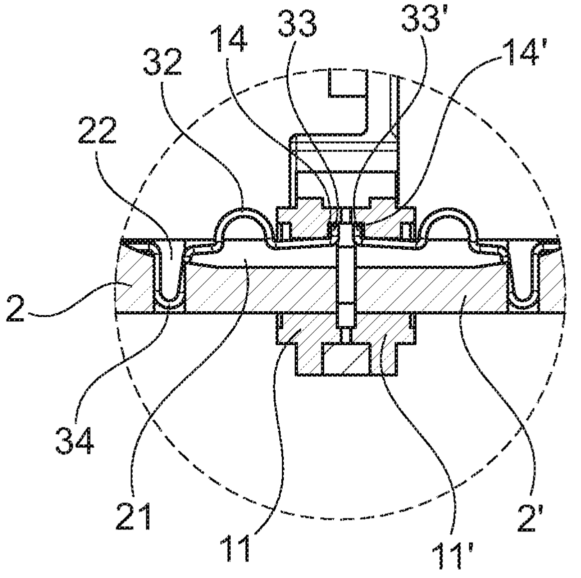
Figure 5B:
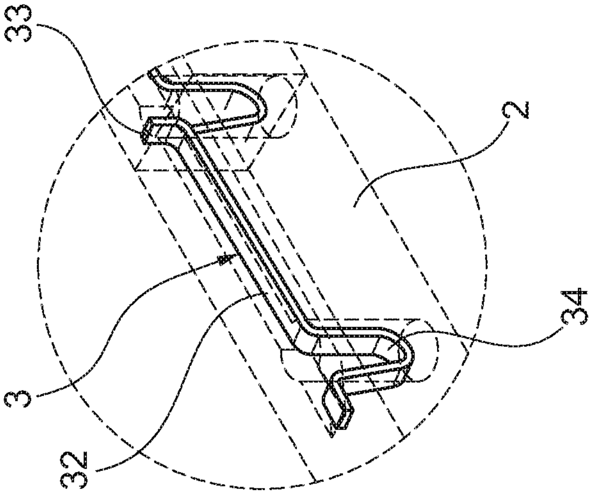
Figure 5A:
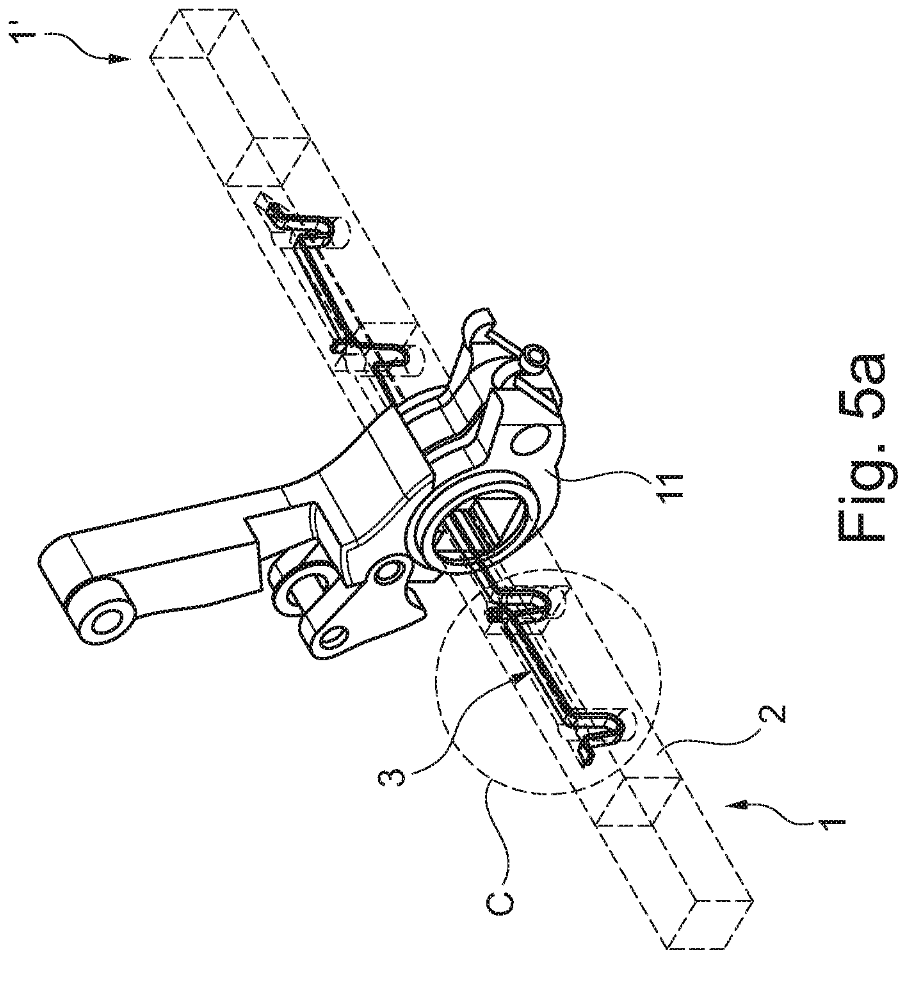
Figure 6B:
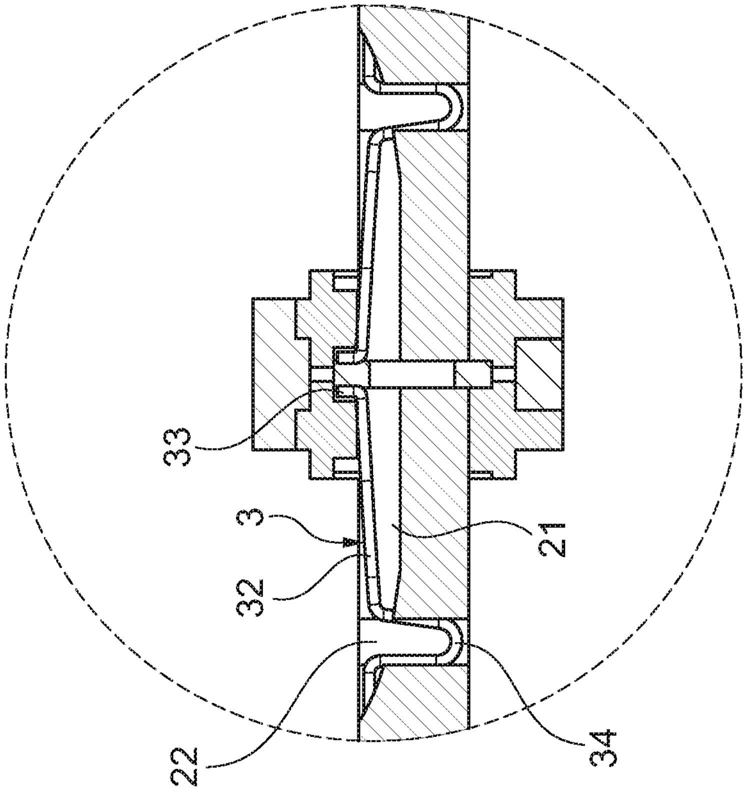
Figure 6A:
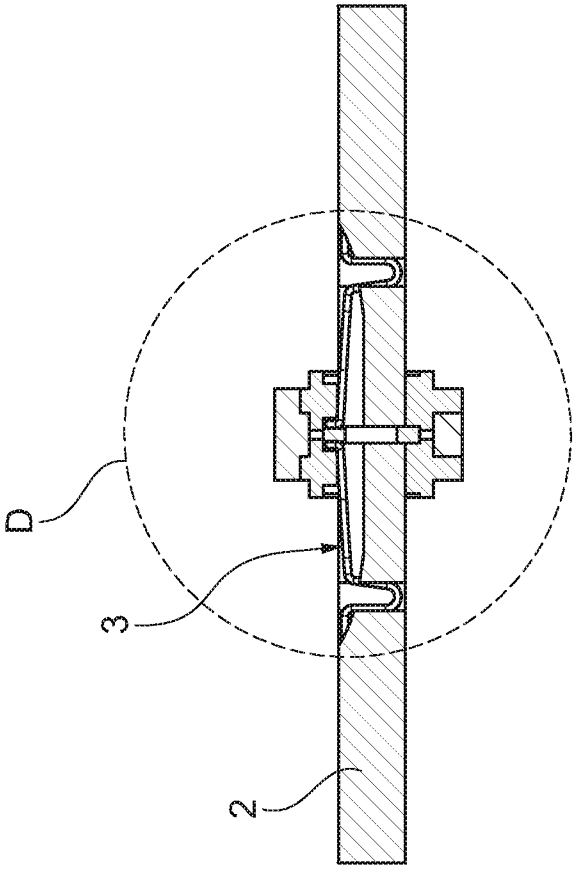

FIG. 2*a* discloses a perspective view of a mounting arrangement according to the preferred embodiment of the invention together with a handle follower before mounting;

FIG. 2*b* discloses a perspective view of the mounting arrangement and handle follower of FIG. 2*a* after mounting;

FIG. 3*a* discloses a cross-sectional view from the side of a handle follower and mounting arrangement according to the preferred embodiment of the invention before mounting;

FIG. 3*b* discloses an enlarged cross-sectional view of the mounting arrangement of the area in FIG. 3*a* denoted with A;

FIG. 4*a* discloses a cross-sectional view from the side of the handle follower and mounting arrangement of FIG. 3*a* after mounting;

FIG. 4*b* discloses an enlarged cross-sectional view of the mounting arrangement of the area in FIG. 4*a* denoted with B;

FIG. 5*a* discloses a perspective view of a handle follower and mounting arrangement according to a second embodiment of the invention after mounting;

FIG. 5*b* discloses an enlarged perspective view of the mounting arrangement of the area in FIG. 5*a* denoted with C;

FIG. 6*a* discloses a cross-sectional view from the side of the handle follower and mounting arrangement of FIG. 5*a* after mounting; and FIG. 6*b* discloses an enlarged cross-sectional view of the mounting arrangement of the area in FIG. 6*a* denoted with D.

DETAILED DESCRIPTION

FIG. 1*a* and 1*b* disclose a locking device 10 and a mounting arrangement 1 according to a preferred embodiment of the present invention. The mounting arrangement 1 is mounted in a handle follower 11 that is operatively connected to a bolt operating mechanism for operating a bolt 20 as is well known within the art. Since general operation of a locking device is not within the scope of the present invention, this will not be described in detail in the following except where it is relevant to the present invention.

Thus, the mounting arrangement 1 comprises a shaft 2 that is mounted in the handle follower 11 by insertion into a central opening 12 in the handle follower 11 (see FIG. 2*a*). The preferred embodiment of the mounting arrangement 1 comprises a longitudinal groove 21 in which a release member 32 is shown. FIG. 1*b* and FIG. 2*a*-2*b* further disclose a second mounting arrangement 1' on an opposite side of the locking device 10. A door handle is mountable on each of these mounting arrangements 1, 1' as is well known within the art. The locking device 10 has a split spindle arrangement wherein each of the mounting arrangements 1, 1' is mounted in a handle follower 11, 11' that rotate independently of each other, so that a rotation of one door handle mounted on a mounting arrangement 1, 1' does not force a corresponding rotation of a door handle mounted on the other mounting arrangement 1, 1'. This is also well known within the art and will not be discussed in more detail. In the following, only one of the mounting arrangements 1, 1' will be described but it is to be noted that what is said with reference to one mounting arrangement 1, 1' may equally well be applied to the other. Also, one of the mounting arrangements 1, 1' according to one embodiment of the invention may also be combined with a mounting arrangement 1, 1' according to another embodiment as is deemed suitable.

FIGS. 2*a*-2*b* show the mounting arrangement 1 according to the preferred embodiment together with the handle follower 11 having the central opening 12 into which the mounting arrangement 1 can be inserted. In FIG. 2*a*, the mounting arrangement 1 is shown in an unmounted state, i.e. before mounting or after release from the handle follower 11. The shaft 2 comprises a transversal opening 22 and a longitudinal groove 21 in which a locking member 33 and a release member 32 are at least partly placed. In its most general form, the mounting arrangement according to the present invention comprises a locking member 33 that is biased away from the shaft 2, preferably in an essentially perpendicular direction so that the locking member 33 is pressed towards an inside of the central opening 12 during mounting. In this most general form, the invention also comprises a release member 32 that can be operated, preferably by pressing the release member 32 towards the shaft 2 to act against the bias of the locking member 33 and thereby retract the locking member 33 towards the shaft 2. In this preferred embodiment, the locking member 33 and release member 32 form part of a shaft operator 3 that is a wire spring in this embodiment but that may alternatively be a leaf spring as described below. The main function of the shaft operator 3 is to be firmly attached in one end to the shaft 2 and to provide the biasing force at its other end where the locking member 33 is located. It is advantageous in the preferred embodiment for the shaft operator 3 to be placed into the opening 22 and into the groove 21 so that at least the locking member 33 but preferably both the locking member 33 and the release member 32 are flush with the shaft 2 at insertion into the central opening 12. The opening 22 is in this embodiment transversally arranged on the shaft 2 but may in other embodiments instead be a circular opening, elliptical opening or of any other suitable shape. The shaft 2 has a shaft end that is inserted into the handle follower 11 when mounted. The term shaft operator as used herein denotes a component that comprises both the locking member 33 and the release member 32.

The locking member 33 or release member 32 or the shaft operator 3 may be attached to the shaft 2 by insertion of a portion of the shaft operator 3 or locking member or release member into a cavity or groove on the shaft 2 where it is held securely, for instance through a biasing force from the portion inside the cavity or groove against walls of the cavity or groove. Other possibilities include a portion of the locking member 32 or release member 33 or the shaft operator 3 being glued, welded or bolted in place on the shaft 2 or in a cavity or groove in the shaft 2.

When using a bolt to fixate the locking member 32, release member 33 or shaft operator 3, material from the shaft 2 itself can be used or alternatively material from the locking member 32, release member 33 or shaft operator 3 may serve this purpose. Alternatively, a separate bolt can be added and used in this way.

The bolting can be done so that the locking member 32 or release member 33 or alternatively the shaft operator 3 is attached to an upper side of the shaft 2 or to a side or bottom of the groove 21, or alternatively the locking member 32 or release member 33, or the shaft operator 3, can extend through the shaft 2 and be fixed to a bottom or side of the shaft 2.

The groove 21 should be large enough to accommodate the shaft operator 3 or the locking member 32 and release member 33, or alternatively to accommodate at least a part of them.

FIG. 2*b* show the mounting arrangement 1 in a mounted state where the locking member 33 locks the shaft 2 in place so that undesired removal is prevented. In the mounted state, the release member 32 extends in a loop above the shaft 2 and is available for releasing the locking member 33 by pressing the loop 32 downwards into the groove 21 so that the shaft 2 can be retracted from the central opening 12.

In the preferred embodiment, the locking member 33 is moved from a locking position in which the locking member 33 extends from the shaft 2 so that the shaft 2 is prevented from leaving is position in the central opening 12 of the handle follower 11. When the release member 32 is activated, preferably by pressing on the release member 32, the locking member 33 is moved from the locking position to a release position where it is pressed towards the shaft 2 until the locking member 33 is flush with an inner wall of the central opening 12 so that the shaft 2 is no longer prevented from leaving the handle follower 11.

In this preferred embodiment, and also in the second embodiment described below the locking member 33 is biased towards the locking position and the release member 32 acts against the bias in order to move the locking member 33 into the release position. In another embodiment, however, the locking member could alternatively not be biased towards the locking position but could instead simply be movable between the locking position and the release position by the release member 32. In this embodiment, the locking member 33 could be fixed in the locking position by a catch or blocking member that could be identical with the release member 32 or could be a separate part of the mounting arrangement 1. In another embodiment, the locking member 33 could be biased towards the release position and the release member 32 could instead act against that bias in order to move the locking member 33 into the locking position. A catch or blocking member could be provided for fixating the locking member 33 in the fixed position. Other variants of the present invention are also possible within the scope of the independent claims, as will be readily understood by the skilled person. FIG. 3*a* shows the mounting arrangement 1 in a cross-sectional view where the groove 21 is shown more clearly. The biasing force is created by a first portion 34 of the shaft operator 3 being inserted into the transversal opening 22 in such a way that a biasing force in a direction of an arrow shown in FIG. 3*b* is created. The biasing force F may be directed at an angle to a perpendicular direction from the shaft 2, as long as one component of the force F is perpendicular to a surface of the shaft 2. This enables the locking member 33 to be pressed against the handle follower 11 and to be pushed into a cavity in a wall of the central opening 12 or into a play or space provided on an inner side 13 of the handle follower 11 to prevent retraction of the shaft 2 from the handle follower 11. Thus, the shaft operator 3 may be seen as comprising a first portion 34 that fastens the shaft operator 3 to the shaft 2 and a second portion 32, 33 that comprises the release member 32 and the locking member 33 and that is biased towards the handle follower 11 in the mounted state.

In FIG. 2*a*-2*b* the shaft operator 3 is in the form of a wire spring but it is to be noted that the shaft operator 3 could instead be a leaf spring, and that only minor modifications to dimensions of the groove 21, transversal opening 22 and to the cavity, play or space into which the locking member 33 is inserted in the mounted state are required to be able to use the leaf spring instead of the wire spring.

In one embodiment, the groove 21 and transversal opening 22 could be avoided altogether by instead providing a shaft 2 that is integrated with a locking member 33 and release member 32 that are biased away from the shaft. Alternatively, the shaft 2 could have slightly smaller dimensions so that a shaft operator 3 or some combination of a release member 32 and locking member 33 could be fastened to a surface of the shaft 2 and be able to fit within the central opening 12 of the handle follower 11. Such fastening could be effected through rivets or other suitable means.

FIG. 4*a*-4*b* show the preferred embodiment in the mounted state, where the locking member 33 fits into a cavity 14 in a wall of the central opening 12.

When mounting arrangements 1, 1' are mounted from both sides of the locking device the shafts 2, 2' and handle followers 11, 11' are still able to rotate independently because of the cavity 14, 14' that prevent the locking members 33, 33' from contacting each other. Alternatively, a play can be provided on the inner side 13 of the handle follower 11 to enable this. It is advantageous to remove as little as possible of the surface on the inside of the central opening 12 to maintain strength of the handle follower 11. In some embodiments, it is advantageous to provide the cavity 14 in the form of one cavity on each side of the central opening 12 that is essentially rectangular in shape, thus providing four different cavities 14 so that the mounting arrangement 1 can be mounted regardless of a rotational position of the handle follower 11. In some embodiments, the cavity 14 can be provided in the form of a groove that extends along at least part of a circumference of a wall of the central opening 12 on the inner side 13. This allows for the locking member 33 to extend in any suitable direction from the shaft and does not require that the locking member 33 be provided in a groove 21 or at a given part of the shaft.

It is to be noted that when it is said herein the when movement of the locking member 33 is described as towards the shaft 2, e.g. in order to move from the locking position to the release position for the preferred embodiment and the second embodiment, the movement towards the shaft 2 is to be understood as a movement towards a central portion of the shaft 2.

Thus, a movement taking place within a groove 21 in the shaft is said to be in a direction towards the shaft 2 if the movement is performed towards a bottom of the groove. Conversely, a movement away from the shaft 2 is to be understood as a movement that has at least one component in a direction that is perpendicular to a surface of the shaft 2 and that extends in a direction essentially opposite to the direction towards the central portion of the shaft 2. If the shaft 2 is held in a horizontal direction and the locking member 33 is mounted on an upper side of the shaft 2, the direction of movement when moving towards the locking position would be an upwards direction, whereas a movement towards the release position would be a downwards direction.

FIG. 5*a*-5*b* show a second embodiment of the present invention that differs from the preferred embodiment described above mainly in the release member 32 being shaped to lie flush with a surface of the shaft 2. This has the advantage that the mounting arrangement 1 can be combined with any kind of handle (not shown) and that the release member 32 doesn't block the handle during mounting or alternatively that the release member 32 is not inadvertently operated by the handle being fitted too close to the release member 32. Rather, the release member 32 of the second embodiment can be operated in the same way as the release member of the preferred embodiment by applying a force to act against the bias, but the risk of operating the release member 32 by accident is eliminated.

FIGS. 6*a*-6*b* show the second embodiment in the mounted state, especially disclosing that the release member 32 is at least flush with the surface of the shaft 2 but preferably beneath the surface.

The mounting and dismounting of a mounting arrangement 1 into a locking device 10 will now be described in more detail with reference to FIG. 1*a*-6*b*. In order to mount and dismount a mounting arrangement 1 according to other embodiments described above may have to be modified to fit with particular features of those embodiments, as will be readily understood by the skilled person.

Before mounting in the locking device 10, a bolt operator 3 or alternatively a locking member 33 and release member 32 are mounted on a shaft 2 to form an arrangement 1. This can be performed during manufacture of the arrangement, or alternatively the bolt operator 3 or the locking member 33 and release member 32 can be components that are manufactured, stored and transported separate from the shaft 2 and that are assembled by a person mounting the locking device 10 in a door.

The arrangement 1 is inserted into the central opening 12 of the handle follower 11, preferably by tilting the shaft 2 with a front end slightly downwards to allow the locking member 33 to enter the central opening 12 despite the bias. As soon as the locking member 33 abuts an inner surface of the central opening 12, the shaft 2 is tilted to extend essentially perpendicular to the locking device 10, i.e. essentially horizontally when the locking device 10 is mounted in a door. The shaft 2 can now be inserted through the central opening 12 and the locking member 33 rests against the inner surface of the central opening 12 during this insertion.

At end of the insertion, the locking member 33 reaches the cavity 14 or alternatively the play on the inner side 13 of the handle follower 11. Due to the bias, the locking member 33 extends into the cavity 14 or play and thereby prevents retraction of the shaft 2 through the central opening 12. This is the mounted state.

In the mounted state, a rotation of the shaft 2 will bring the handle follower 11 to rotate as well, thereby transferring a rotational movement from a handle mounted on the shaft 2 to the handle follower 11 that is in turn operatively connected to a bolt operating mechanism for operating a bolt 20.

When the mounting arrangement 1 is to be removed from the locking device 10, a force is applied to the release member 32 for pushing the release member towards the shaft 2. This is performed by pressing a finger on a loop such as is shown by the preferred embodiment or by pressing any suitable object against the release member 32 inside the groove 21 as shown by the second embodiment. When the release member 32 is pressed down towards the shaft 2, the locking member 33 is at the same time pressed towards the shaft 2 and is thereby released from the cavity 14 or play on the inner side 13 of the handle follower 11. As soon as the locking member 33 has been pressed down to be completely released, either by being flush with the surface of the shaft 2 or by being retracted towards the shaft a sufficient distance to be able to contact the inner surface of the central opening 12, the shaft 2 can be removed from the handle follower 11 by retraction along the central opening 12. As soon as the shaft 2 has started its movement so that the locking member 33 no longer can enter the cavity 14 or play on the inner side 13 of the handle follower 11, the pressure against the release member 32 is no longer required to enable release of the shaft 2.

It is to be noted that features from the various embodiments described herein may freely be combined, unless it is explicitly stated that such a combination would be unsuitable.

The invention claimed is:

1. The combination of a mounting arrangement (1) for fastening a shaft (2) in a locking device, comprising the shaft (2) for insertion into a handle follower (11) of the locking device, a locking member (33) situated at an end of the shaft (2) for fixating the shaft (2) after insertion to prevent undesired removal from the handle follower (11), with the locking member (33) extending upwardly inside the handle follower (11) upon insertion, and a release member (32) for releasing the locking member (33) to enable desired removal of the shaft (2) from the handle follower (11), wherein the locking member (33) is movable between a locking position for fixating the shaft (2) in the handle follower (11) and a release position, the release member (32) is operatively connected to the locking member (33) for moving the locking member (33) from the locking position to the release position, the locking member (33) and the release member (32) form part of a shaft operator (3), the shaft operator (3) comprises a first portion (34) to fasten the shaft operator (3) to the shaft (2), and a second portion (32, 33) comprising both the locking member (33) and the release member (32), the release member (32) is biased away from the shaft (2) and connected to the locking member (33) such that an applied force that acts against the bias of the release member (32) also acts against the bias of the locking member (33), the release member (32) is accessible from outside the handle follower (11) from the same side the shaft (2) is inserted into the handle follower (11), and the shaft (2) comprises a groove (21), with the release member (32) arranged to extend along said groove (21) and lie flush with a surface of the shaft (2) or beneath a surface of the shaft (2).

2. The combination according to claim 1, wherein the locking member (33) is biased away from the shaft (2) towards the locking position, and the release member (32) is operatively connected to the locking member (33) for acting against the bias and pressing the locking member (33) towards the shaft (2) into the release position for releasing the locking member (33).

3. The combination according to claim 1, wherein the locking member (33) is also arranged at least partly in said groove (21).

4. The combination according to claim 1, wherein said second portion (32, 33) extends in a longitudinal direction along the shaft (2) towards a shaft end, said first portion (34) being configured to create a bias so that the second portion (32, 33) is biased in a transversal direction away from the shaft (2).

5. The combination according to claim 1, wherein the locking member (33) and the release member (32) form part of a leaf spring or wire spring.

6. The combination according to claim 1, wherein the shaft operator (3) comprising the locking member (33) and release member (32) is integrated with or fixedly attached to the shaft (2).

7. The combination according to claim 1, wherein the handle follower (11) is configured for transmitting a rotary motion from the shaft (2) to a bolt mechanism for operating a bolt (20).

8. The combination according to claim 1, comprising separate shafts (2) extending into the handle follower (11) from opposite sides thereof, and separately rotatable from one another.

9. The combination of a mounting arrangement (1) for fastening a shaft (2) in a locking device, comprising the shaft (2) for insertion into a handle follower (11) of the locking device, a locking member (33) for fixating the shaft (2) after insertion to prevent undesired removal from the handle follower (11), and a release member (32) for releasing the locking member (33) to enable desired removal of the shaft (2) from the handle follower (11), wherein the locking member (33) is movable between a locking position for fixating the shaft (2) in the handle follower (11) and a release position, the release member (32) is operatively connected to the locking member (33) for moving the locking member (33) from the locking position to the release position, the locking member (33) and the release member (32) form part of a shaft operator (3), the shaft operator (3) comprises a first portion (34) to fasten the shaft operator (3) to the shaft (2), and a second portion (32, 33) comprising both the locking member (33) and the release member (32), the release member (32) is biased away from the shaft (2) and connected to the locking member (33) such that an applied force that acts against the bias of the release member (32) also acts against the bias of the locking member (33), the shaft (2) comprises a groove (21), with the release member (32) arranged to extend along said groove (21) and lie flush with a surface of the shaft (2) or beneath a surface of the shaft (2), said second portion (32, 33) extends in a longitudinal direction along the shaft (2) towards a shaft end, said first portion (34) being configured to create a bias so that the second portion (32, 33) is biased in a transversal direction away from the shaft (2), and the locking member (33) is an end portion of the second portion (32, 33) of the shaft operator (3), said end portion (33) being configured to extend in an essentially transversal direction from the shaft (2) for cooperating with said handle follower (11) to prevent removal of the shaft (2) from the handle follower (11).

10. The combination of a mounting arrangement (1) for fastening a shaft (2) in a locking device, comprising the shaft (2) for insertion into a handle follower (11) of the locking device, a locking member (33) for fixating the shaft (2) after insertion to prevent undesired removal from the handle follower (11), and a release member (32) for releasing the locking member (33) to enable desired removal of the shaft (2) from the handle follower (11), wherein the locking member (33) is movable between a locking position for fixating the shaft (2) in the handle follower (11) and a release position, the release member (32) is operatively connected to the locking member (33) for moving the locking member (33) from the locking position to the release position, the locking member (33) and the release member (32) form part of a shaft operator (3), the shaft operator (3) comprises a first portion (34) to fasten the shaft operator (3) to the shaft (2), and a second portion (32, 33) comprising both the locking member (33) and the release member (32), the release member (32) is biased away from the shaft (2) and connected to the locking member (33) such that an applied force that acts against the bias of the release member (32) also acts against the bias of the locking member (33), the shaft (2) comprises a groove (21), with the release member (32) arranged to extend along said groove (21) and lie flush with a surface of the shaft (2) or beneath a surface of the shaft (2), the handle follower (11) is configured for transmitting a rotary motion from the shaft (2) to a bolt mechanism for operating a bolt (20), and the handle follower (11) comprises at least one cavity for receiving the locking member (33) for fixating the shaft (2).

11. The combination of a mounting arrangement (1) for fastening a shaft (2) in a locking device, comprising the shaft (2) for insertion into a handle follower (11) of the locking device, a locking member (33) for fixating the shaft (2) after insertion to prevent undesired removal from the handle follower (11), and a release member (32) for releasing the locking member (33) to enable desired removal of the shaft (2) from the handle follower (11), wherein the locking member (33) is movable between a locking position for fixating the shaft (2) in the handle follower (11) and a release position, the release member (32) is operatively connected to the locking member (33) for moving the locking member (33) from the locking position to the release position, the locking member (33) and the release member (32) form part of a shaft operator (3), the shaft operator (3) comprises a first portion (34) to fasten the shaft operator (3) to the shaft (2), and a second portion (32, 33) comprising both the locking member (33) and the release member (32), the release member (32) is biased away from the shaft (2) and connected to the locking member (33) such that an applied force that acts against the bias of the release member (32) also acts against the bias of the locking member (33), the shaft (2) comprises a groove (21), with the release member (32) arranged to extend along said groove (21) and lie flush with a surface of the shaft (2) or beneath a surface of the shaft (2), the handle follower (11) is configured for transmitting a rotary motion from the shaft (2) to a bolt mechanism for operating a bolt (20), and the handle follower (11) comprises a groove along an inner circumference of the handle follower (11) for receiving the locking member (33).

* * * * *